Jan. 1, 1963

L. B. SCOTT

BINARY CONVERTER

Filed Oct. 31, 1960

3,071,320

INVENTOR.
Larkin B. Scott
BY
Harold E. Bramblett Jr.
ATTORNEY.

United States Patent Office 3,071,320
Patented Jan. 1, 1963

3,071,320

BINARY CONVERTER

Larkin B. Scott, Fort Worth, Tex., assignor to The Perkin-Elmer Corporation, Norwalk, Conn., a corporation of New York Filed Oct. 31, 1960, Ser. No. 66,197
10 Claims. (Cl. 235—61)

This invention relates to a novel apparatus for converting between two binary number systems and, more particularly, to a novel slide rule for accomplishing such a conversion.

The common binary system is a well known numerical system based on powers of two rather than on powers of ten as in the common decimal system. The primary advantage of a binary system is that any number may thus be written as a series of "ones" and "zeros." This is especially advantageous in digital computer systems as it greatly simplifies the mechanical elements and electrical circuitry required. For example, "ones" and "zeros" may be expressed in the "on-off" positions of a single-pole switch or in the magnetized or unmagnetized states of a section of magnetic tape. If the decimal system were employed, it would be necessary to utilize circuit elements having ten different positions or "states" to perform the arithmetic functions.

The common binary system is formed in the same manner as the decimal system. The method for forming the common binary equivalents of the numbers 0–9 is illustrated in the following table:

TABLE I

| Decimal No. | $2^3$ (8) | $2^2$ (4) | $2^1$ (2) | $2^0$ (1) | Binary No. |
|---|---|---|---|---|---|
| 0 | 0 | 0 | 0 | 0 | 0000 |
| 1 | 0 | 0 | 0 | 1 | 0001 |
| 2 | 0 | 0 | 1 | 0 | 0010 |
| 3 | 0 | 0 | 1 | 1 | 0011 |
| 4 | 0 | 1 | 0 | 0 | 0100 |
| 5 | 0 | 1 | 0 | 1 | 0101 |
| 6 | 0 | 1 | 1 | 0 | 0110 |
| 7 | 0 | 1 | 1 | 1 | 0111 |
| 8 | 1 | 0 | 0 | 0 | 1000 |
| 9 | 1 | 0 | 0 | 1 | 1001 |

While the common binary system has many advantages over the decimal system, it also has certain inherent disadvantages. One of these results from the fact that in going from one number to the next it is often necessary for several elements to change state simultaneously. As it is mechanically impossible to make such changes exactly simultaneously, incorrect readings may often be inadvertently injected into the computations. For example, it will be seen from Table I that in going from seven to eight, all four counters must change state.

In order to overcome this disadvantage, other binary codes, for example the Gray code, are often employed. The most characteristic feature of the Gray code is that, in going from one number to the next, it is never necessary to change more than one digit. The Gray code numbers as related to their decimal and common binary equivalents are shown in Table II:

TABLE II

| Decimal | Common Binary | Gray |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |

Those employed in the digital computer art often find it necessary to convert from common binary to Gray, or vice versa. In going from common binary to Gray, the rule is followed that any digit preceded by a "1" is changed to the opposite state. For example, the common binary number for "six" is 0110. The fourth digit is preceded by a "1" and is, therefore, changed to "1." The third digit is also preceded by a "1" and is changed to "0." The resulting Gray number is 0101.

In converting from Gray to common binary, whenever a digit is preceded by a "1," the state of the digit is changed. The process is carried on cumulatively from left to right in any number. For example, in converting the Gray number 0101, neither the first nor second digit is preceded by a "1." However, the third digit is, and is therefore changed from "0" to "1." This means that the fourth digit is now preceded by a "1" so it, too, is changed from "1" to "0." The resulting common binary number is 0110.

It will be readily apparent that the conversion between common binary and Gray is not only troublesome and time-consuming but is also a source of error. It is, therefore, the primary object of the present invention to provide an apparatus for easily making such a conversion.

Other objects are to provide such an apparatus which is inexpensive, simple to operate, and equally suitable for converting Gray to common binary or common binary to Gray.

The manner in which the foregoing objects are achieved will be more apparent from the following description, appended claims, and the figures of the attached drawing wherein:

Figures 1, 2, 3, 4, 5:
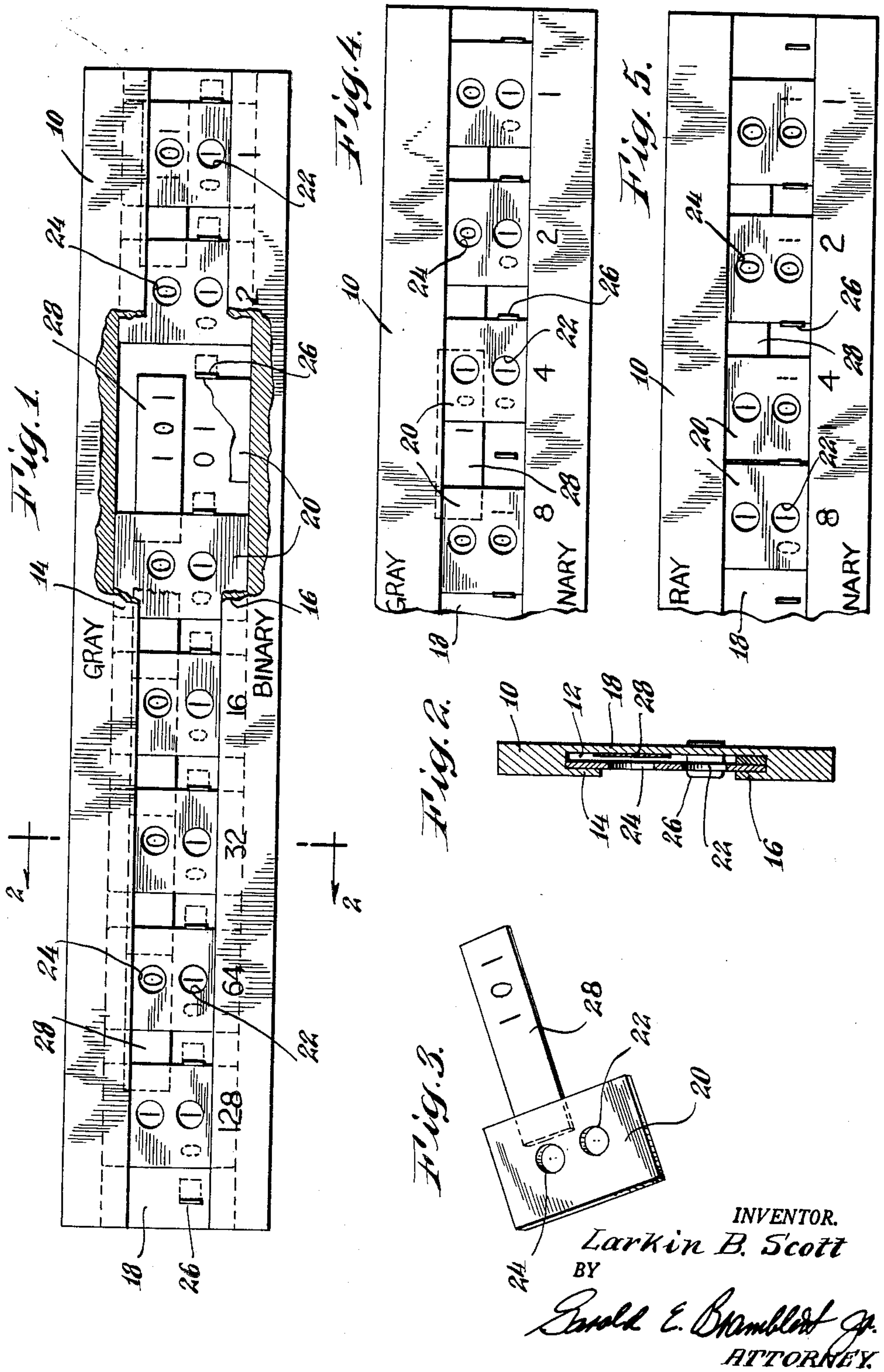
FIGURE 1 is a plan view of a slide rule constructed in accordance with the present invention, partially cut away to show details of construction.
FIGURE 2 is a cross section taken along the line 2—2 of FIGURE 1.
FIGURE 3 is a perspective view of one of the sliding elements of the apparatus.
FIGURE 4 is a plan view of one end of the rule set to the number "7" for illustrative purposes.
FIGURE 5 is a view similar to that of FIGURE 4 showing the rule set to the number "8."

With particular reference to FIGURES 1 and 2, it will be seen that a specific embodiment of the invention comprises a slide rule body 10 having a recessed portion 12 and overhanging lips 14 and 16. The rule is divided along its length into eight sections and each section is marked with the equivalent value of a power of two, increasing from right to left. This is illustrated in FIGURE 1 wherein the lower lip 16 carries the markings "1, 2, 4, 8, 16, 32, 64, 128" representing values from $2^0$ to $2^7$.

In conjunction with each of the numbers representing a power of two, the lower half of the back panel 18 formed by recess 12 carries a pair of digits "0" and "1" as shown in FIGURE 1. The upper half of panel 18 is free of numbers except at the extreme left end where the digits "0" and "1" are also imprinted directly above the similar numbers carried below.

Over each "0–1" pair is positioned a rectangular slider 20 longitudinally movable along recess 12. Each of sliders 20 contains a lower window 22 and an upper window 24. Window 22 of each slider 20 is positioned in alignment with the row of "0–1" pairs and the longitudinal movement of each slider is limited by suitable stops 26 to a single pair. In the illustrated embodiment, each of stops 26 is a small sheet metal angle having one lip affixed to back panel 18 and the other extending at right angles from the upper surface of panel 18. The positions of stops 26 are such that at one extreme of slider travel a lower window 22 is positioned over a "0" and, at the other extreme, over a "1."

Affixed to each of sliders 20 is a tab 28 imprinted with the digits "1–0–1." This tab is positioned underneath the adjoining right hand slider and is so aligned that the digits imprinted upon it are visible through the upper window 24 of the overlying slider. When any two adjoining sliders are positioned at their extreme left limits of travel, the upper window of the right hand slider will be positioned over the central "0" of the tab carried by the left hand slider. It will thus be apparent that movement of either slider will cause the digit "1" to appear in upper window 24 of the right hand slider.

The actual operation of this device will be apparent from the example illustrated in FIGURES 4 and 5. In FIGURE 4 the setting for the decimal number seven is shown. The number seven contains no eights but does contain one "four," one "two," and one "one." The resulting common binary number is shown in the lower windows of the sliders and is seen to be 0111. The equivalent Gray number shown in the upper windows is 0100.

In FIGURE 5, the rule is set to the decimal number eight. As the number eight contains one "eight" but no "four," "two," or "one," the common binary number as shown is 1000. The equivalent Gray number shown in the upper windows is 1100.

The slide rule described and illustrated herein is capable of converting any number up to $$128+64+32+16+8+4+2+1=255$$

to its common binary or Gray equivalent. It will be obvious that this range may be extended indefinitely by merely lengthening the rule to add additional sections at the left end. For example, adding one more power of two ($2^8=256$) extends the useful range to 511.

It will also be obvious that the rule of this invention may be constructed of any of a wide variety of materials including wood, metal, and plastic and need not necessarily be of linear construction. For example, the rule could be circular in form with the sliders traversing the circumference of a circle. Consequently, the word "line" as used in the claims includes both straight and curved lines.

Other variations and modifications of this invention will be apparent to those skilled in the art. The foregoing description is intended to be illustrative only and the invention is limited only by the scope of the following claims.

I claim:

1. Apparatus for converting a first binary coded number to a second binary coded number which comprises a body means containing a series of binary digits; a plurality of adjustable first indicating means adapted to indicate on said body means the successive digits of said first binary number; and a plurality of second indicating means responsive to the adjustment of said first indicating means and adapted to indicate the successive digits of a second coded number equivalent to said binary coded number.

2. Apparatus for converting a number expressed in a first binary code to the number expressed in a second binary code which comprises body member means having thereon a first line of binary indicia; a plurality of adjustable first indicating means for indicating on said first line of indicia the successive digits of the number expressed in said first binary code; binary indicia carrying means fixedly attached to each of said first indicating means, the plurality of indicia carrying means forming a second line of binary indicia; and a plurality of second indicating means each responsive to the adjustment of one of said first indicating means and adapted to indicate on said second line of indicia the successive digits of the number expressed in said second binary code.

3. Apparatus for converting a number expressed in a first binary code to the number expressed in a second binary code which comprises elongated body member means having thereon a first line of binary indicia; a plurality of first indicating means longitudinally movable on said body member means for indicating on said first line of indicia the successive digits of the number expressed in said first binary code; binary indicia carrying means fixedly attached to each of said first indicating means for movement therewith, the plurality of indicia carrying means forming a second line of binary indicia; and a plurality of second indicating means each longitudinally slideable with one of said first indicating means and adapted to indicate on said second line of indicia the successive digits of the number expressed in said second binary code.

4. Apparatus for converting a number expressed in a first binary code to the number expressed in a second binary code which comprises elongated body member means having thereon a plurality of binary pairs forming a first line of binary indicia; a plurality of first indicating means longitudinally movable along said body member means to indicate on said first line of indicia the successive digits of the number expressed in said first binary code; indicia carrying means fixedly attached to each of said first indicating means and having thereon three binary indicia, the plurality of indicia carrying means forming a second line of binary indicia; and a plurality of second indicating means each longitudinally moveable with one of said first indicating means and adapted to indicate on said second line of indicia the successive digits of the number expressed in said second binary code.

5. Apparatus for converting a number expressed in a first binary code to the number expressed in a second binary code which comprises an elongated body member; a first line of pairs of binary markings on said body member; a plurality of movable slide members on said body member positioned to selectively expose said binary markings; a second line of binary markings underlying said slide members, said second line of markings being sectionalized into groups of three indicia, each of said groups being movable by one of said slide members; and indicating means on each of said slide members positioned to selectively expose one of the three indicia of a single group in accordance with the positions of the slide member and the adjacent slide member moving said group.

6. Apparatus for converting a number expressed in a first binary code to the number expressed in a second binary code which comprises an elongated body member defining a longitudinal channel therein; a first line of binary markings on said body member parallel to the longitudinal axis thereof and of alternating values; a plurality of movable slide members, each slide member being positioned to selectively expose one of an adjoining pair of said binary markings; a second line of binary markings parallel to the first line of markings and adjacent said slide members, said second line of markings being sectionalized into groups of three indicia, each of said groups being movable by one of said slide members; and indicating means on each of said slide members positioned to selectively expose one of the three indicia of a single group in accordance with the position of the slide member and the position of the adjacent slide member moving said group.

7. Apparatus for converting a number expressed in a first binary code to the number expressed in a second binary code which comprises a body member divided into sections; a first line of binary indicia on said member comprising a plurality of groups of two dissimilar signs, each of said groups positioned within a body member section; indexing means within each section slidable to a first position and a second position; tab means controlled by each of said indexing means and having three aligned indicia thereon, the outer two of said three indicia being of a first sign and the middle one of a second sign, each tab means extending into the adjacent body member section, the indicia of said tab means forming a second line parallel to said first line of indicia; a first window defined by each indexing means and adapted to selectively expose one of the indicia of a single group within said first line in accordance with the position of said indexing means; and a second window defined by each indexing means and adapted to selectively expose one of the indicia of said second line in accordance with the position of its indexing means and the position of the tab means extending into its body member section.

8. Apparatus for converting a number expressed in a first binary code to the number expressed in a second binary code which comprises an elongated body member divided into sections; a first line of binary indicia on said member comprising a plurality of groups of two dissimilar signs, each of said groups positioned within a body member section; indexing means slideable within each section between a first position and a second position; a plurality of elongated tab means each having one end affixed to one of said indexing means and having three aligned indicia thereon, the outer two of said three indicia being of a first sign and the middle one of a second sign, each tab means extending into the next adjacent body member section and below the adjacent indexing means, the indicia of said tab means forming a second line parallel to said first line of indicia; a first window defined by each indexing means and adapted to selectively expose one of the indicia of a single group within said first line in accordance with the position of said indexing means; and a second window defined by each indexing means and adapted to selectively expose one of the indicia of said second line.

9. Apparatus for converting a number expressed in a first binary code to the number expressed in a second binary code which comprises an elongated body member divided into sections; a first line of alternating binary indicia on said member, one of each type of indicia being positioned within each body member section; indexing means slideable within each section along the longitudinal axis of said body member between a first position and a second position; tab means attached to each of said indexing means and having three aligned binary indicia thereon, the outer two of said three indicia being of a first type and the middle one of a second type, each tab means extending into the adjacent body member section and below the indexing means thereof, the indicia of said tab means forming a second line parallel to said first line of indicia; a first window defined by each indexing means and adapted to selectively expose one of the indicia of said first line positioned within a body member section in accordance with the position of said indexing means; and a second window defined by each indexing means and positioned to selectively expose one of the indicia of said second line.

10. Apparatus for converting between common binary coded numbers and Gray coded numbers which comprises an elongated body member having printed thereon a series of aligned digital pairs, each of said pairs comprising a zero and a one; a plurality of slideable elements, each having a first index and a second index and moveable to indicate with said first index either digit of a single digital pair; and a tab means affixed to each of said indexing means for movement therewith relative to an adjoining slideable element, each of said tab means bearing the three digit series 101 in such relationship that one digit of said series is indicated by the second index of an adjoining slideable element.

References Cited in the file of this patent

UNITED STATES PATENTS 2,973,510 Hazlett ---------------- Feb. 28, 1961